United States Patent
Nishiyama

(10) Patent No.: US 7,836,727 B2
(45) Date of Patent: Nov. 23, 2010

(54) GLASS CUTTING METHOD

(75) Inventor: Tomohiro Nishiyama, Osaka (JP)

(73) Assignee: Nishiyama Stainless Chemical Co., Ltd., Toyonaka-shi, Osaka (JP)

( * ) Notice: Subject to any disclaimer, the term of this patent is extended or adjusted under 35 U.S.C. 154(b) by 133 days.

(21) Appl. No.: 12/068,612

(22) Filed: Feb. 8, 2008

(65) Prior Publication Data

US 2008/0202298 A1 Aug. 28, 2008

Related U.S. Application Data

(63) Continuation of application No. 10/794,295, filed on Mar. 4, 2004, now abandoned.

(30) Foreign Application Priority Data

Mar. 24, 2003 (JP) .............................. 2003-079675
Sep. 22, 2003 (JP) .............................. 2003-329865

(51) Int. Cl.
*C03C 15/00* (2006.01)

(52) U.S. Cl. ........................................ 65/30.1; 65/21.5

(58) Field of Classification Search ................. 65/31, 65/30.13, 30.1, 112, 21.5; 225/94, 96; 83/879, 83/880
See application file for complete search history.

(56) References Cited

U.S. PATENT DOCUMENTS 6,423,930 B1 * 7/2002 Matsumoto ............ 219/121.69
2002/0041946 A1 * 4/2002 Abe ........................... 428/64.2

* cited by examiner

*Primary Examiner*—Carlos Lopez
(74) *Attorney, Agent, or Firm*—Birch, Stewart, Kolash & Birch, LLP

(57) ABSTRACT

A method of cutting a glass substrate to form a plurality of flat panel displays. The method includes forming a scribe line or a line of weakness on a surface of a mother material; treating the mother material with chemical to further weaken the mother material; and cutting the mother material. The scribe line may be formed using a masking technique. The mother material may be treated with chemical by putting the mother material into a chemical solution. Alternatively, the chemical may be sprayed, blown, or exposed to the mother material. The cutting of the mother material may be done by applying mechanical and/or thermal stress along the scribe line.

9 Claims, 8 Drawing Sheets

GLASS CUTTING METHOD

CROSS REFERENCE TO RELATED APPLICATIONS

This application is a Continuation Application of U.S. application Ser. No. 10/794,295 filed on Mar. 4, 2004, now abandoned, and claims priority to two Japanese applications: (1) 2003-079675 filed Mar. 24, 2003; and (2) 2003-329865 filed Sep. 22, 2003, which are incorporated by reference.

FIELD OF THE INVENTION

This invention relates to a method of cutting glass and, particularly, to a method of a cutting glass plate.

BACKGROUND OF THE INVENTION

A glass substrate used in fabrication of a flat panel display such as a liquid crystal display, a plasma display or an electroluminescence display is manufactured from a glass plate larger in size than the glass substrate as a raw material (hereinafter, such a glass flat e will be referred to as "mother material"). The glass substrate is manufactured by means of a method of cutting a mother material. For example, as for a glass substrate for a liquid crystal display used in a 15 inch monitor, as described in FIG. 1, four pieces of the substrate are obtained from a mother material of 550 mm×650 mm in size. Glass substrates can be obtained by cutting one mother material. In such a case, a glass plate on a surface of which a film is formed is used as a mother material and glass substrates can be obtained by cutting it.

On the other hand, in a case where a glass substrate for use in a small liquid crystal display is manufactured, it is an important cutting method of directly cutting a glass substrate obtained by adhesion. The reason therefor is that the glass substrate for use in a liquid crystal display is of a structure in which two sub-glass substrates are adhered to each other with a sealing agent. The glass substrate for used in a liquid crystal here has cells 1 in which a liquid crystal is sealed between the two sub-glass substrates.

Cutting of a mother material is disclosed in the following non-patent literatures: Yasuaki Miyake, "Scribe and Brake Technique", Monthly FPD Intelligence, a special number entitled LCD Fabrication and Inspection Technique in the 4th generation, published by Press Journal Inc. on Jan. 20, 2000, pp 85-89) (hereinafter referred to as "non-patent literature 1"); and Takeshi Yamamoto, "Light Beam Orientation Device Capable of Use in Clean Room and Laser Glass Cutting Device," Monthly FPD Intelligence 1994. 4," published by Press Journal Inc., pp 28-31) (hereinafter, referred to as "non-patent literature 2"). The cutting of a mother material disclosed in the non-patent literatures 1 and 2 includes: a scribing step of forming a scribe line on a surface of the mother material; and a step of applying a mechanical or thermal stress on the scribe line. This cutting method is called a scribe and brake method.

A cutting method described in the non-patent literature 1 is a general scribe and brake method. This scribe and brake method includes a scribe line forming step and a mechanical stress applying step. The scribe line forming step is a step of scratching a mother material surface with a diamond or sintered carbide wheel cutter to form a scribe line. A depth of a scribe line formed in this step is a value of the order in the range of from 10 to 15% of the thickness of a mother material. A mechanical stress applying step is a step of applying a mechanical stress on a site where a scribe line is formed. In this step, glass substrates are cut from the mother material.

A cutting method described in the non-patent literature 2 includes a scribe line forming step and a thermal stress applying step. This cutting method is a method adopted in a glass cutting apparatus from ACCUDYNE Co. in USA. The scribe line forming step includes the sub-steps of: (1) forming a small physical damage at an end of a mother material with a metal foil; (2) illuminating the physical damage with a linear laser beam; and (3) spraying a mixed gas of helium and water onto the mother material immediately after the illumination with the laser beam to rapidly cool it. In the scribe line forming step, a scribe line on a molecular level is formed in the mother material. The thermal stress applying step is a step of illuminating both sides of a scribe line with laser light, followed by spraying the mixture of helium and water onto the scribe line to thereby cool it. By laser beam illumination and cooling immediately thereafter, a thermal stress arises at the scribed line to cut a glass substrate from the mother material.

In the cutting method described in the non-patent literature 1, however, the following problems have remained unsolved. A first problem is that cracks occur in a mother material surface and in the vicinity of the mother material surface in formation of a scribe line. The cracks easily lead to glass cullet both in scribing and cutting. A second problem is that a number of cracks occur at an intersection between scribe lines in formation of the scribe lines. Breakage of a mother material occurs in cutting because of the presence of the cracks with ease. The glass substrates obtained by cutting are weak in edge strength thereof because of the presence of the cracks. A third problem is that, in order to improve an edge strength of a glass substrate, it is required to chamfer a glass substrate. In order to remove glass powder and the like accompanied by chamfering, a necessity arises for cleaning. That is, the cutting method is problematic because of a low productivity as a cutting method of a glass substrate.

On the other hand, the cutting method described in the non-patent literature 2 has been expected to have an effect of being unnecessary for a clean process or a chamfering process after the cutting, therefore with a high productivity. A problem has been still remained, however, in the cutting method because of a low cutting precision and a reduced speed in cutting process. Moreover, a cutting apparatus from ACCUDYNE Co. disclosed in the non-patent literature 2 is expensive, therefore, the apparatus cannot be widely proliferated in general use.

It has been understood that glass breakage occurs from a fine physical damage originally present on a mother material surface. Therefore, with reduction in surface physical damage on a surface of the glass substrate itself, it contributes to more improvement on glass strength and more prevention of glass breakage. In a case where a polishing process is applied that removes a physical damage on a surface of the glass substrate, it lowers productivity in cutting of a glass substrate. On the other hand, if reduction can be achieved in physical damage on a glass surface during the cutting process of a mother material, the productivity in cutting of a glass substrate may be improved. Therefore, there is a need for reducing a physical damage on a mother material surface during the cutting process.

SUMMARY OF THE INVENTION

This invention provides a glass cutting method in which the generation of glass cullet and cracks in glass are suppressed to thereby achieve a glass substrate with a high dimensional precision. That is, this invention provides a glass cutting method capable of removing plane cracks during formation of a scribe line, or to provide a glass cutting method in which formation of a scribe line can be achieved without generating cracks. This may be accompanied by a glass cutting method where a scribe line is formed on a glass surface, followed by a chemical treatment.

In situations where a mother material is cut by applying a mechanical stress or a thermal stress thereto, a stress is concentrated at a scribe line or a slit (hereinafter, collectively referred to as "scribe line or the like"). As a result, the generation of glass cullet and glass breakage is suppressed during cutting.

With this invention, there is less need for a cutting face treatment step after the cutting. This means that the cutting of a glass substrate is performed at a low cost. This also means that productivity in glass cutting is improved. Since physical on a surface of a mother material on which no masking is applied is reduced by a chemical treatment, a strength of a glass substrate can be raised.

In a case where a mother material is immersed in a chemical treatment solution during the chemical treatment, bubbles or a jet stream may be generated in the chemical treatment solution. In these cases, the chemical treatment solution is agitated. In a case where bubbles are generated, a product produced in the chemical treatment solution is prevented from being attached onto the glass.

In the chemical treatment, the chemical treatment solution preferably moves along a glass surface. For example, by causing the bubbles and the jet stream to move along the glass surface, the chemical treatment solution can also be moved along the glass surface. In this case, physical damage to the mother material is reduced.

The chemical treatment may also be used to cause a chemical treatment solution to flow into a portion in which a scribe line or the like is formed. For example, by causing the bubbles and the jet stream to flow into a portion in which a scribe line or the like is formed, the chemical treatment solution can be caused to flow into the portion in which a scribe line or the like is formed. In a case where the chemical treatment solution is caused to flow into a portion in which a scribe line or the like is formed, an action is great that deepens a depth of the scribe line or the like.

The chemical treatment may be a treatment in which a chemical treatment solution is sprayed onto a glass surface, a vapor of the chemical treatment solution is blown onto a glass surface, or a glass surface is exposed to a vapor of the chemical treatment solution. After the chemical treatment ends, a mechanical or thermal stress may be applied onto a scribe line or the like to cut the glass. To cut the glass by applying the mechanical stress, the glass may be cut in such a manner that a tension is applied in a direction moving away glass portions from each other with a scribe line or the like as a center. Alternatively, a pressure may be applied either in a direction facing a glass surface on which a scribe line or the like is formed or in a direction facing the other surface opposite the surface on which the scribe line or the like is formed to thereby apply a mechanical stress onto a scribe line or the like and to cut glass. To apply a pressure on the surface on which a scribe line or the like is formed is preferred to the other way. In order to cut glass by applying the thermal stress, it is preferable that after the chemical treatment ends, both sides of a scribe line or the like are illuminated with laser light to thereby cut glass.

The invention minimizes cracks from forming in glass caused by cutting of a glass substrate. As a result, a dimensional precision of a glass substrate for a liquid crystal display can be raised. Furthermore, by decreasing physical damage on a glass surface on which no masking is performed, a strength of a glass substrate can be improved.

DETAILED DESCRIPTION OF THE INVENTION

Figure 1:
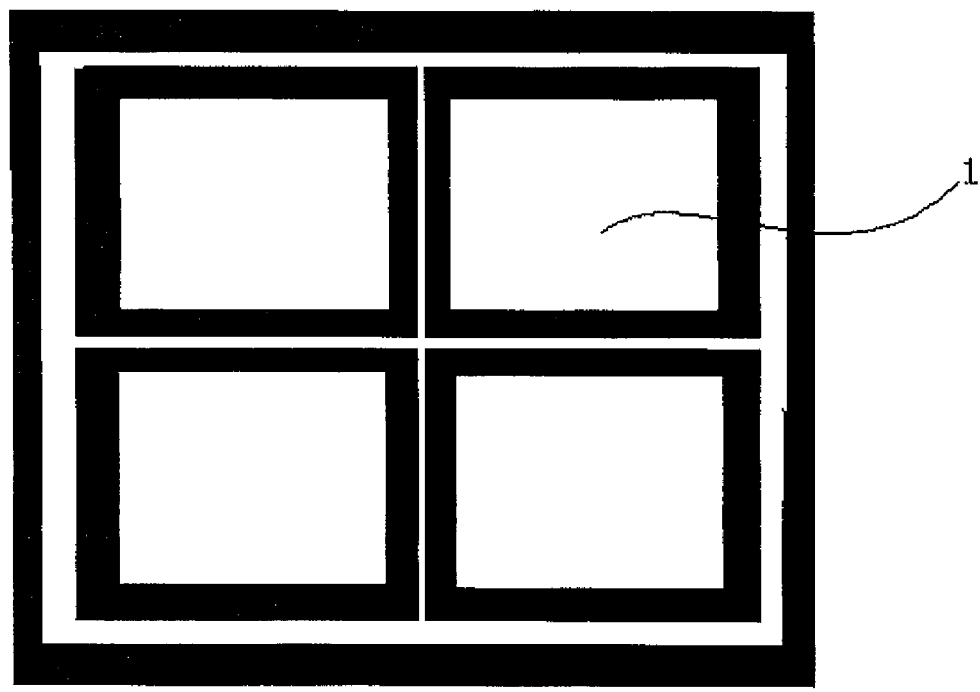
FIG. 1 shows a glass plate from which four glass substrates for a liquid crystal display can be obtained.

Hereinafter, description will be given of embodiments of a cutting method of the invention. A glass cutting method of the invention includes the steps of: forming a scribe line on a surface of a mother material; performing a chemical treatment; and cutting the mother material.

One sheet of a glass substrate is used as glass that can be cut by means of a method of the invention. In a case where a liquid crystal display glass substrate is manufactured, a mother material may be adopted that is obtained by adhering two glass substrates to each other with a sealing agent. The adhered glass substrate usually includes a color filter layer or the like necessary for a liquid crystal display glass substrate.

A scribe line 3 on a surface of a mother material 2, similarly to a conventional technique, can be formed with a diamond cutter or a sintered carbide wheel cutter. A scribe line is formed by scribing a line on a mother material with a diamond cutter or a sintered carbide wheel cutter.

In a case where a scribe line 3 or the like is formed on one sub-substrate of an adhered glass substrate, a scribe line of the like is usually formed on the other sub-substrate usually directly below the scribe line on the one sub-substrate. In a case where the scribe line on the other sub-substrate can not be formed directly below, a cut face of the adhered glass substrate takes a stepwise profile in the thickness direction. With this stepwise profile, the lower step of the profile can work as an adhering fixing portion to another member.

A chemical treatment is effected by applying a chemical treatment solution on a glass as a mother material. The chemical treatment solution may be a solution containing a chemical dissolving glass. The chemical treatment solution is preferably an aqueous solution containing hydrofluoric acid. The hydrofluoric acid aqueous solution preferably contains one or more kind selected from the group consisting of hydrofluoride, an inorganic acid and an organic acid.

Examples of hydrofluorides include ammonium fluoride, potassium fluoride and sodium fluoride. Examples of inorganic acids include hydrochloric acid, sulfuric acid, phosphoric acid and nitric acid. Examples of organic acids include acetic acid and succinic acid. One or more kinds of an anionic surfactant and an ampholytic surfactant may be added to a chemical treatment solution. A sulfonate type surfactant and the like are used as an anionic surfactant. An amine type surfactant, for example, is used as an ampholytic surfactant.

Main actions of each of the chemicals in chemical treatment solutions are as follows. Hydrofluoric acid and hydrofluoride work so as to etch off glass chemically. An inorganic acid, an organic acid, an anionic surfactant and an ampholytic surfactant work so as to prevent a product occurring in a chemical treatment solution from being attached onto a glass surface.

A time during which a mother material is in contact with a chemical treatment solution, as well as a chemical treatment solution temperature, are properly altered according to a composition of a mother material, and a thickness thereof.

Methods of bringing a chemical treatment solution into contact with a mother material include the following (1) to (4) methods, for example, (1) immersion of a mother material in a chemical treatment solution, (2) spraying a chemical treatment solution onto a mother material, (3) blowing a vapor of a chemical treatment solution onto a mother material, and (4) a mother material being exposed to a vapor of a chemical treatment solution.

In a case where a mother material is immersed in a chemical treatment solution, it is preferable to generate bubbles or a jet stream of the chemical treatment solution therein. In order to generate bubbles or a jet stream of the chemical treatment solution, it is recommended to install a bubble generator or a jet device for the chemical treatment solution at the bottom of a chemical treatment solution reservoir. In this case, it is possible to attain an effect of agitating the chemical treatment solution. In a case where a bubble generator is installed, a product in the chemical treatment solution is raised to the surface thereof, thereby preventing the product from being attached onto the glass.

A bubble stream and a jet stream are the same as a stream of the chemical treatment solution. Since a physical damage on a glass surface is a recess, the chemical treatment solution therein is hard to be exposed to the stream of the chemical treatment solution. Therefore, the chemical treatment solution in the recess comes into a stationary state to thereby slow an etching reaction velocity there with ease. As a result, portions other than recesses are etched off ahead thereof, thereby reducing physical damage to the glass surface. Therefore, by moving the chemical treatment solution along the glass surface, a great effect can be achieved that reduces physical damage to the glass surface. As a motion of the chemical treatment solution nears a motion substantially in parallel to a glass surface, a greater effect of reducing physical damage is assured.

Furthermore, an effect arises that a corner of a glass substrate is chamfered. This effect is achieved in conjunction with a chemical treatment. In a case where the chemical treatment solution flows substantially in parallel to the glass surface, an effect of chamfering the corner of a glass substrate grows especially large.

On the other hand, in case where the chemical treatment solution is caused to flow into a portion in which a scribe line or the like is formed, the chemical treatment solution in the portion in which a scribe line or the like is formed enters a moving state, thereby increasing an etching reaction velocity; and further deepening a depth of a scribe line or the like. In a case where the chemical treatment solution is caused to flow into a scribe line or the like along a direction substantially normal to a glass surface, a depth of a scribe line or the like is increased. In a case where the chemical treatment solution is caused to flow into a scribe line or the like as well, a corner of a glass substrate is chamfered.

In a case where a bubble generator or a chemical treatment solution jet device is installed at the bottom of a chemical treatment solution reservoir, a method of immersing a mother material in a chemical treatment solution is selected from the following viewpoint.

In a case where it is desired to increase an effect of decreasing physical damages on a glass surface, a mother glass substrate is lowered into the chemical treatment solution in a direction normal to a surface of the solution. In a case where it is desired to increase an effect to deepen a depth of a scribe line or the like, a mother glass plate is immersed in the chemical treatment solution in parallel to the surface thereof. The mother material may be immersed in the chemical treatment solution obliquely relative to the surface of the solution.

After a chemical treatment ends, a mother material is cut. As a cutting method, it is recommended to cut glass applying a mechanical or thermal stress thereonto. Methods of cutting by a mechanical stress include a method of cutting by an applied tension or pressurization. A method of cutting glass by a tension is a method in which a tension is applied in a direction moving away glass portions from each other with a scribe line or the like as a center. On the other hand, a pressurizing method is a method by applying a pressure at a scribe line or the like to thereby cut glass. The pressurizing method is a preferable as a cutting method.

Figure 2:
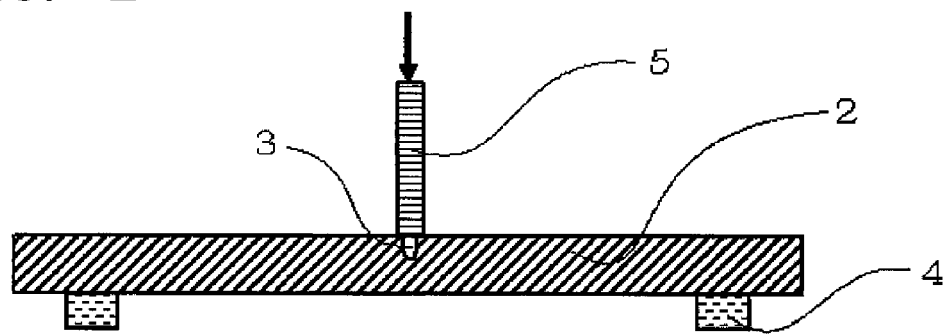
FIG. 2 is a view illustrating a pressure cutting step of the invention.

In a case of a pressurizing method, a pressure may be applied either in a direction facing a surface on which a scribe line or the like is formed, or in a direction facing the other surface opposite the surface on which a scribe line or the like is formed. It is preferable to apply a pressure on the surface on which a scribe line or the like is formed. FIG. 2 shows an example of a state where a pressure is applied on the surface on which a scribe line or the like is formed. The mother material 2 is bridged between two rest tables 4. Then, a pressure tool 5 works so as to apply a pressure to the scribe line 3 or the like from right thereabove to enable a mother material 2 to be cut.

In a case where a pressure is applied on a surface on which a scribe line 3 or the like is formed to cut a mother material 2, the mother material 2 can be cut with a pressure smaller than on the other surface opposite the surface on which a scribe line 3 or the like is formed. A mother material 2 with a shallower scribe line 3 or the like thereon can be cut while sustaining a smoothness on a cut face. For example, in a case where a chemical treatment is applied onto an aluminoborosilicate glass on which a slit of 20 μm in depth is formed, and of 40 mm by 60 mm by 0.7 mm in size to cut it, it has been confirmed that a pressure of 3000 g or more is necessary when a pressure is applied on the other surface opposite the surface on which a slit 3 is formed. On the other hand, it has been confirmed that glass is cut with a pressure in the range of 1500 or more and 2000 g or less when a pressure is applied on the surface on which a slit 3 is formed.

That is, since only a smaller pressure is required, quick cutting can be realized. Since there is a small chance that a pressure is distributed to portions other than the scribe line 3, it can be prevented to generate cracks of glass in cutting. Note that a pressure tool brought into contact with glass may be a flat plate. A thinner plate is preferably used.

As a method of applying a thermal stress, there has been available, for example, a method in which both sides of a scribe line 3 or the like are illuminated with laser light to thereby cut glass. In this case, laser heating is effected at a temperature of glass melting temperature or lower.

The following examples illustrate the application of the invention. It should be noted that the present invention is not limited to the following examples.

EXAMPLE 1

Two liquid crystal display glass sheets of 400 mm by 500 mm by 0.7 mm in size were adhered to each other with a sealing agent. Scribe lines of about 0.05 mm in depth were formed on both surfaces thereof with a diamond cutter. One scribe line was formed so as to be directly below the other scribe line. Then, a thickness of the adhered glass was reduced in a chemical treatment by a thickness of the order of 0.4 mm.

A chemical treatment was conducted in the following conditions:

(1) A chemical treatment solution was an aqueous solution containing 5% hydrofluoric acid, 10% hydrochloric acid and 5% nitric acid;

(2) The adhered glass was immersed in the chemical treatment solution with the glass oriented in a direction normal to a surface of the solution;

(3) Bubbles were generated from the bottom of a chemical treatment solution reservoir, wherein bubbles flew substantially in parallel to a glass surface; and (4) After the chemical treatment ended, a pressure was applied at a scribe line from directly above to cut the adhered glass.

COMPARATIVE EXAMPLE 1

Adhered glass was cut without applying a chemical treatment thereto. The cutting was conducted in a similar manner to that in Example 1 except that no chemical treatment was applied.

Figure 3:
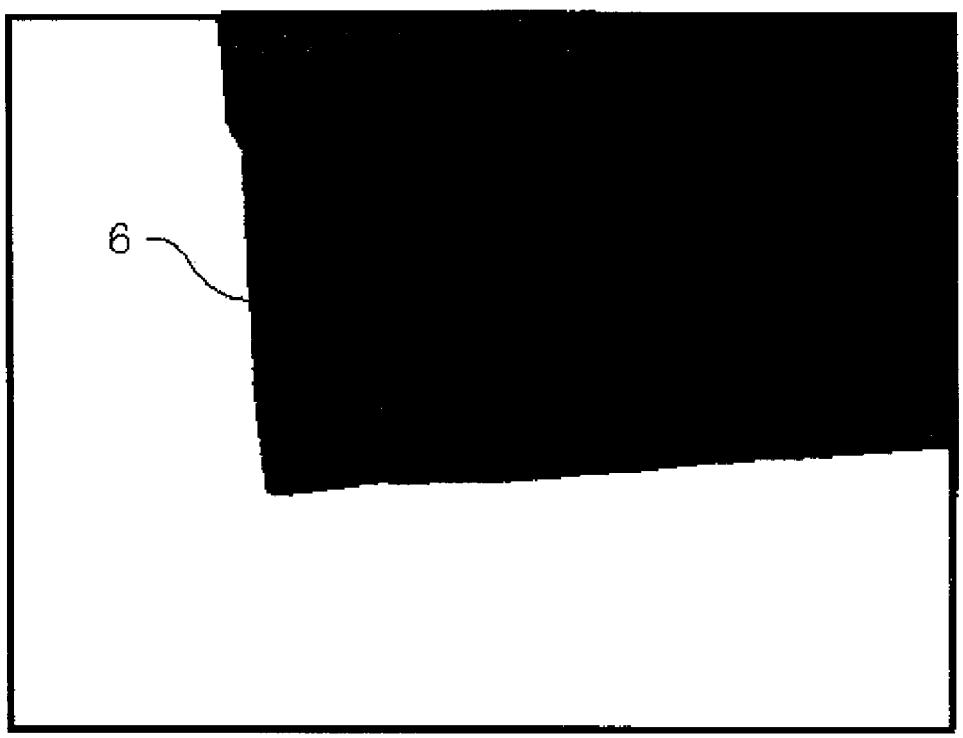
FIG. 3 is a schematic view obtained when a surface contour of a glass substrate obtained by means of a cutting method of the invention is observed with a microscope of a magnification of ×50.
Figure 4:
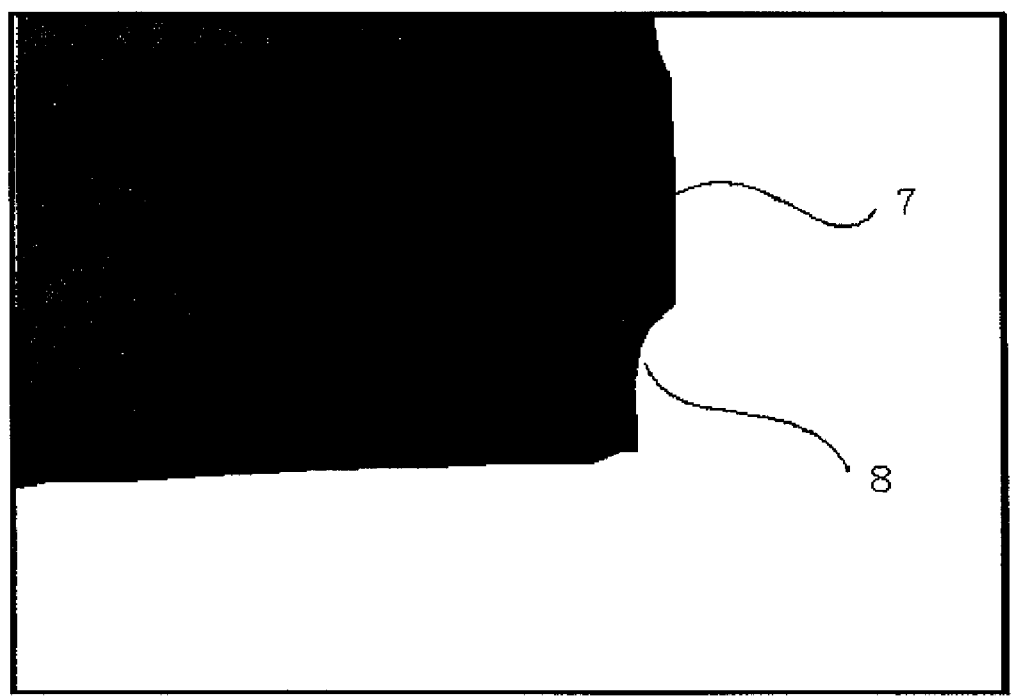
FIG. 4 is a schematic view obtained when a surface contour of a glass substrate obtained by cutting without performing a chemical treatment after formation of a scribe line is observed with a microscope of a magnification of ×50.
Figure 5:
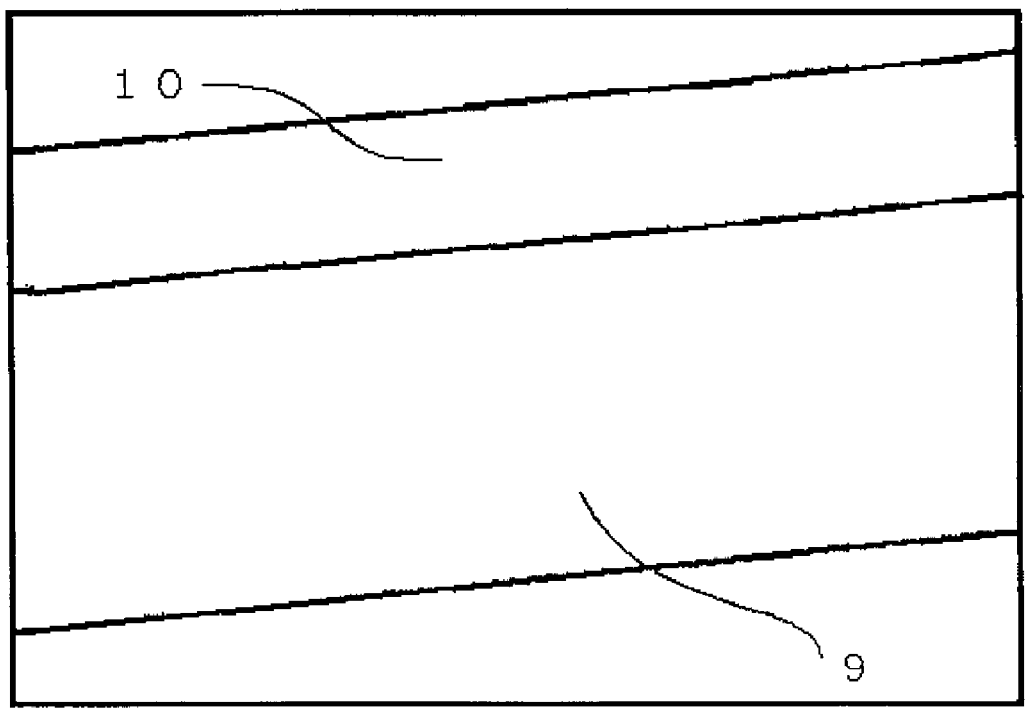
FIG. 5 is a schematic view obtained when a cutting face topograph of a glass substrate obtained by means of a cutting method of the invention is observed with a microscope of a magnification of ×50.
Figure 6:
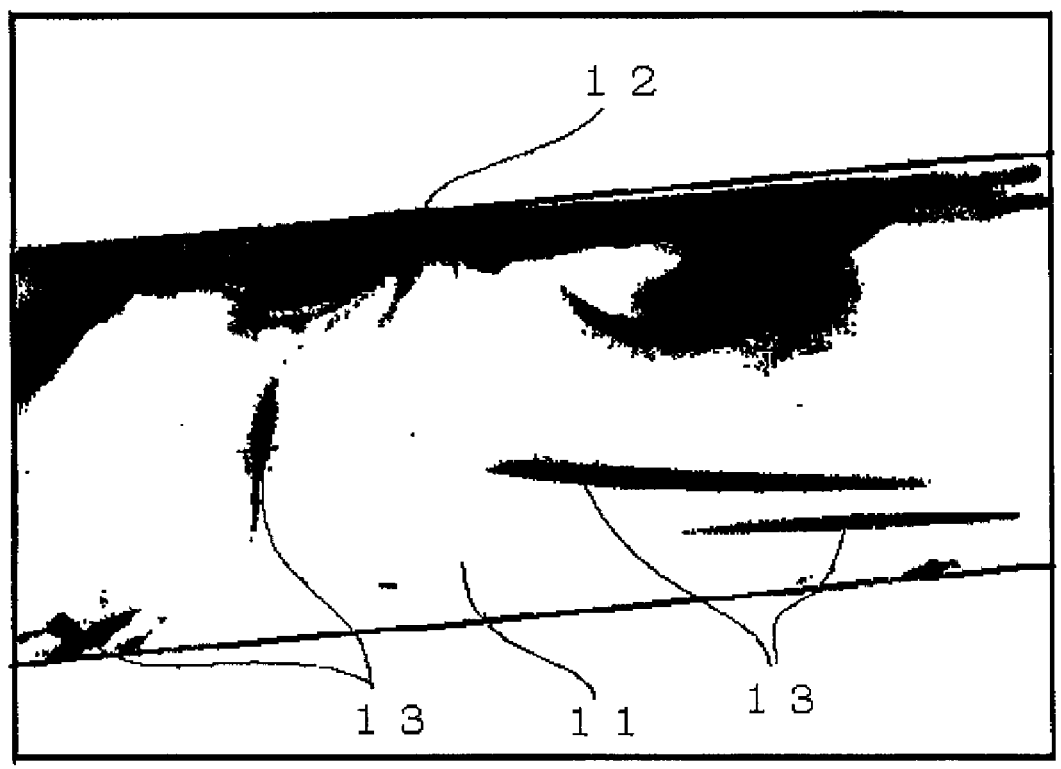
FIG. 6 is a schematic view obtained when a cutting face topograph of a glass substrate obtained by cutting without performing a chemical treatment after formation of a scribe line is observed with a microscope of a magnification of ×50.

Observation was conducted on the glass substrates obtained in Example 1 and Comparative Example 1 under a microscope. FIGS. 3 and 4 are schematic views obtained by observation on shapes of corners of glass substrates in the neighborhood of intersections of scribe lines. FIGS. 5 and 6 are schematic views obtained by observation on cutting face topographs of glass plates. FIGS. 3 and 5 are observation on a glass substrate applied with the chemical treatment (Example 1). FIGS. 4 and 6 are observation on a glass substrate not applied with the chemical treatment (Comparative Example 1).

In FIGS. 3 and 4, portions in black are glass substrates 6 and 7. The corner shape of the glass substrate 6 shown in FIG. 3 is not in a broken glass state altogether. On the other hand, the corner shape of the glass substrate 7 shown in FIG. 4 is recognized to have glass breakage 8. From the observation, it is found that no glass breakage is recognized at a corner of the glass substrate of Example 1 to which the chemical treatment was applied. On the other hand, it is found that glass breakage is recognized at a corner of the glass substrate of Comparative Example 1 in which no chemical treatment was applied. Consequently, it has been recognized that in cutting a glass substrate, cracking of a glass substrate is prevented by applying a chemical treatment thereto.

In FIG. 5, a glass cutting face 9 is smooth. On the other hand, in FIG. 6, a glass cutting face 11 is not smooth, but has cracks 13 thereon. In FIG. 5, a scribe line 10 on a glass surface is linear. On the other hand, in FIG. 6, depressed recesses are shown in black. That is, a scribe line 12 takes an irregular shape with exaggerated depressions and projections. This exaggeration in depression and projections show that glass cracking and breakage occurred in cutting of the glass substrate. Therefore, it has been confirmed that by performing a chemical treatment, glass cracks generated in formation of a scribe line is removed.

It has been confirmed that in the glass sheet of Example 1, a corner shape of a portion in which a scribe line is formed is chamfered. On the other hand, it has been confirmed that in the glass substrate of Comparative Example 1, a corner shape of a portion in which a scribe line is formed is at a right angle or an acute angle (not shown).

Figure 7:
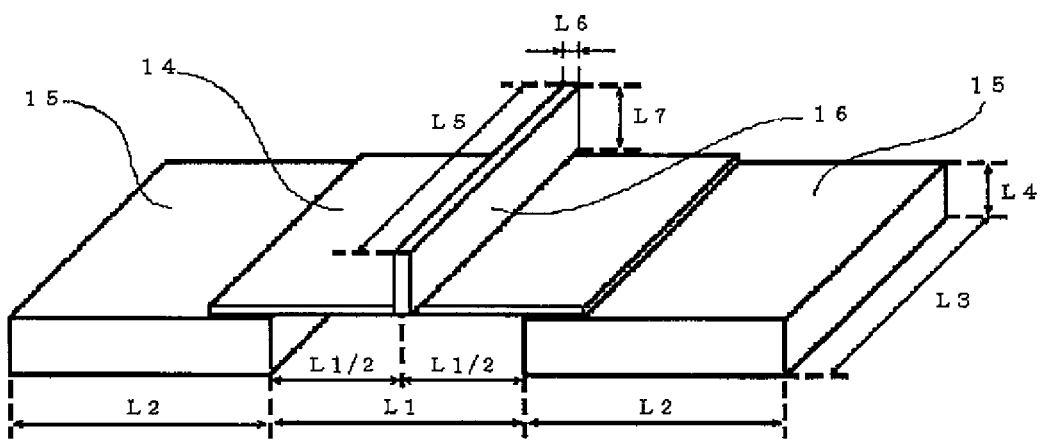
FIG. 7 schematically shows a glass plate strength measuring method.

Strengths of the glass substrates of Example 1 and Comparative Example 1 were measured. The measurement on a glass substrate strength was performed in the following conditions. FIG. 7 shows a measuring method.

(1) Two glass sheet rest tables 15 of 40 mm (L2) by 40 mm (L3) by 8.4 mm (L4) in size were installed in parallel to each other with a spacing (L1) of 49 mm;

(2) a specimen glass sheet 14 was placed on the rest tables 15;

(3) a pressure is applied at a center line of the specimen glass sheet from directly thereabove with a stainless pressure tool 16 of 50 mm (L5) by 2.0 mm (L6) by 10 mm (L7) in size and a speed of the pressure tool was 0.5 mm/min;

(4) the maximum pressure was measured when the specimen was broken; and (5) the maximum pressure was defined as a strength of the glass substrate.

A strength of the glass substrate of Example 1 was 1500 g. On the other hand, a strength of the glass substrate of Comparative Example 1 was 3000 g. That is, it is found that a glass substrate strength is increased.

EXAMPLE 2

Two liquid crystal display glass sheets of 400 mm by 500 mm by 0.7 mm in size were adhered to each other with a sealing agent. Masking was applied on both surfaces and a side surface of the adhered glass. A laminate film was used in masking. Then the laminate film used in the masking was peeled off as a band with a width of 0.2 mm. The peeled portion is a portion in which a slit is formed. The peeling-off of the laminate film was performed on both surfaces of the adhered glass. The peeling-off of the laminate film on the lower surface of the adhered glass was performed directly below the portion on the upper surface thereof in which the peeling off of the laminate film was performed.

Then a chemical treatment was performed. A chemical treatment solution and conditions for bubble generation in the chemical treatment solution were similar to those in Example 1. Immersion of the adhered glass in the chemical treatment solution was performed so that the surface of the chemical treatment solution and a surface of the adhered glass were in parallel to each other. That is, the adhered glass was lowered into the solution so that bubbles impinge on the adhered glass along a vertical direction. The chemical treatment was performed till a slit of 0.05 mm in depth was formed.

Thereafter, a pressure was applied to cut the adhered glass. Observation was conducted under a microscope on the glass substrate obtained according to the above procedures. As a result, it was confirmed that no cracking occurred on the end surface of the glass substrate. It was furthermore confirmed that a cutting face was smooth.

A strength of the glass substrate obtained in Example 2 was performed by the same method as in Example 1. A glass substrate strength was 1500 g.

EXAMPLE 3

A glass substrate was cut by means of a method different from that of Example 2 only in respect of a peeling method of a laminate film. The peeling-off of the laminate films on the upper surface and the lower surface of the adhered glass substrate was in parallel to each other. In addition, the peeling-off of the laminate films on the upper surface and the lower surface of the adhered glass substrate was performed at a spacing of 0.2 mm between peeling bands thereof as viewed from above.

Figure 8:
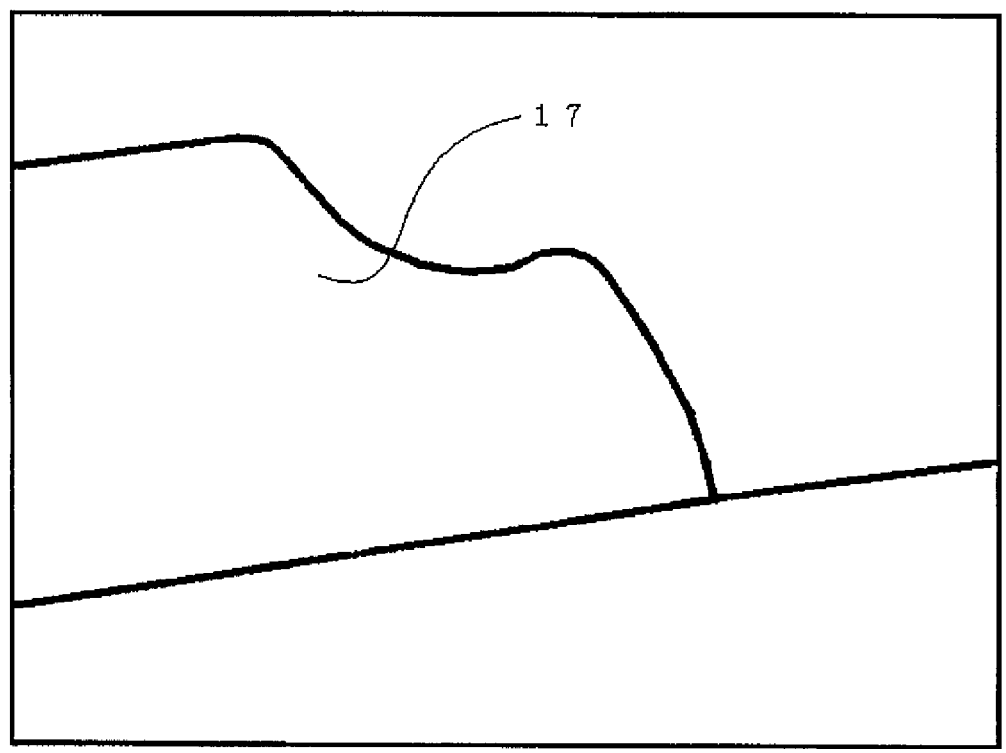
FIG. 8 is a schematic view obtained when an adhered glass substrate cut by means of a cutting method of the invention is observed from a side thereof with a microscope of a magnification of ×50.

Observation was performed on the glass substrate obtained in Example 3 under a microscope. As a result, it was confirmed that cracking at the end surface of the glass substrate and cracking at the cutting face thereof were suppressed. The cutting face was confirmed to be smooth. The glass substrate was observed from a side thereof under a microscope. FIG. 8 is a schematic side view showing the glass substrate. It is found that a glass cutting portion was formed step-wise.

What is claimed is:

1. A method for cutting glass, the method comprising:
   forming a straight scribe line shaped as a groove of a predetermined depth on a glass surface made with a cutter;
   treating the glass surface with a chemical solution to deepen the scribe line and to remove cracks during formation of the scribe line; and
   applying a stress which is concentrated along the deepened scribe line on the glass surface, thereby cutting the glass into at least two portions, and separating the at least two portions of the glass surface along the deepened scribe line,
   wherein the glass surface is immersed into the chemical solution within which bubbles are generated.

2. The method according to claim 1, wherein the stress concentrated on the deepened scribe line on the glass surface is a mechanical stress which is applied to the deepened scribe line.

3. The method according to claim 2, wherein the glass surface has a first side with the scribe line and a second side opposite to the first side, and the stress concentrated along the deepened scribe line on the glass surface is applied to at least one of the sides of the glass surface.

4. The method according to claim 1, wherein the stress concentrated along the deepened scribe line on the glass surface is a thermal stress which is applied to the deepened scribe line.

5. The method according to claim 1, wherein the scribe line defines the at least two portions of the glass surface, and
   wherein the stress is concentrated along the deepened scribe line in order to pull at least the two portions away from each other.

6. A method for manufacturing a glass substrate used for a flat panel display using the method of claim 1.

7. A method of manufacturing a flat panel display using the method of claim 1.

8. The method according to claim 2, wherein the glass surface has a first side and a second side opposite to the first side, wherein the scribe line is formed on only one of the first and second sides.

9. A method for cutting glass, the method comprising:
   forming a straight scribe line of a predetermined depth on a glass surface made with a cutter;
   treating the glass surface with a chemical solution to deepen the scribe line and to remove cracks during formation of the scribe line; and
   applying a stress which is concentrated along the deepened scribe line on the glass surface, thereby cutting the glass into at least two portions, and separating the at least two portions of the glass surface along the deepened scribe line,
   wherein the glass surface is immersed into the chemical solution within which bubbles are generated.

* * * * *